(12) United States Patent
George (10) Patent No.: US 12,373,120 B2
(45) Date of Patent: Jul. 29, 2025

(54) METHOD, DISTRIBUTED CONTROLLER, AND SYSTEM FOR MANAGING SEQUENTIAL STORAGE DEVICES IN DISTRIBUTED STORAGE ENVIRONMENT (71) Applicant: SAMSUNG ELECTRONICS CO., LTD., Suwon-si (KR)

(72) Inventor: Arun George, Bengaluru (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/126,762

(22) Filed: Mar. 27, 2023

(65) Prior Publication Data

US 2024/0241653 A1 Jul. 18, 2024

(30) Foreign Application Priority Data

Jan. 12, 2023 (IN) .............................. 202341002621

(51) Int. Cl.
*G06F 3/06* (2006.01)
(52) U.S. Cl.
CPC .......... *G06F 3/0631* (2013.01); *G06F 3/0613* (2013.01); *G06F 3/067* (2013.01)
(58) Field of Classification Search
CPC ....... G06F 3/0631; G06F 3/0613; G06F 3/067
See application file for complete search history.

(56) References Cited

U.S. PATENT DOCUMENTS

| 2007/0033366 A1* | 2/2007 | Eisenhauer | G06F 3/0605 |
| | | | 711/170 |
| 2017/0250918 A1* | 8/2017 | Billore | G06F 3/0631 |
| 2018/0246670 A1* | 8/2018 | Baptist | G06F 11/108 |
| 2022/0013145 A1* | 1/2022 | Ren | G06F 3/0608 |

* cited by examiner

*Primary Examiner* — Masud K Khan
(74) *Attorney, Agent, or Firm* — Sughrue Mion, PLLC (57) ABSTRACT

The disclosure provides a method, a distributed controller and a system for managing sequential storage devices in a distributed storage environment. The method comprising receiving a client allocation request from a client device and determining at least one zone set from a plurality of zone set based on the client allocation request and predefined I/O parameters. Each zone set of the plurality of zone set comprises a plurality of zones of sequential storage devices. Thereafter, method comprises provisioning the at least one zone set to the client device based on the client allocation request, thereby, managing the sequential storage devices. Each zone of a sequential storage device is arranged into a zone set based on at least one of sequential storage device parameters, and zone parameters. The use of the distributed controller allows optimizing the performance of the sequential storage devices and optimizing the network bandwidth utilization.

18 Claims, 5 Drawing Sheets

FIG. 1A

RELATED ART

FIG. 1B

RELATED ART

METHOD, DISTRIBUTED CONTROLLER, AND SYSTEM FOR MANAGING SEQUENTIAL STORAGE DEVICES IN DISTRIBUTED STORAGE ENVIRONMENT

CROSS-REFERENCE TO RELATED APPLICATION

This application is based on and claims priority from Indian Patent Application No. 202341002621 filed on Jan. 12, 2023, in the Indian Intellectual Property Office, the disclosure of which is incorporated by reference herein in its entirety.

TECHNICAL FIELD

The disclosure relates to storage devices, more particularly, but not exclusively to a method, a distributed controller and a system for managing sequential storage devices in a distributed storage environment.

BACKGROUND

Figure 1A:
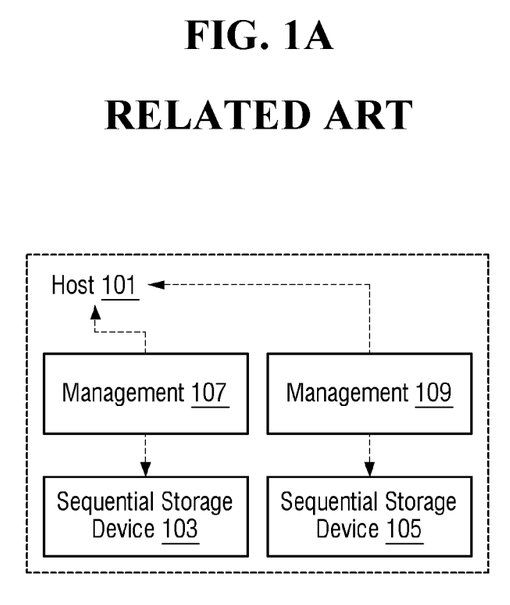
FIGS. 1A and 1B illustrate related art ways of managing sequential storage devices.
Figure 1B:
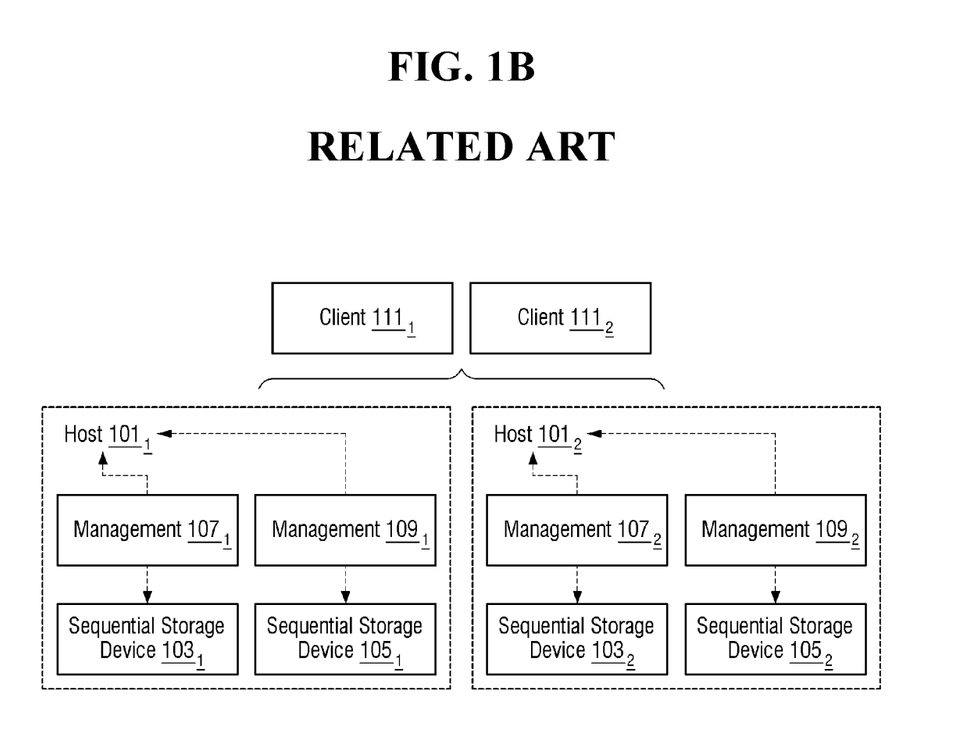

With advancement in telecommunication technology, there is a significant increase in data transmission, and as a result, there is an increased demand for data storage and management of storage devices. In related art, one or more storage devices 103, 105 (also, referred as sequential storage devices) are managed by a host 101 (also, referred as a host device) as shown in FIG. 1A. The host 101 manages the one or more storage devices 103, 105 individually through respective management scheme 107, 109 (also, referred as protocol). FIG. 1B shows an environment including multiple hosts i.e., a host $101_1$ and a host $101_2$, and multiple clients i.e., client $111_1$, and client $111_2$ (also, referred as client device). When a data write request is received from a client, e.g., client $111_2$, by the host $101_1$, the host $101_1$ may execute the write request by writing into at least one of the storage devices $103_1$ and $105_1$. In doing so, the host $101_1$ uses the management scheme $109_1$ to write data into the storage device $105_1$ and uses the management scheme $107_1$ to write data into the storage device $103_1$. Similarly, whenever a data write request is received by a host $101_1$ or host $101_2$, the data write request is executed through respective management scheme. Furthermore, the host $101_1$ may store information related to the storage devices $103_1$, $105_1$ and the host $101_2$ may store information related to the storage devices $103_2$, $105_2$. The information related to the storage devices are stored in respective host in a decentralized manner. The drawback of this arrangement including storing information in a decentralized manner is that some storage devices are used more frequently for example, the storage devices $103_1$ and $105_1$ while other storage devices are less frequently used or unused for example, the storage devices $103_2$ and $105_2$, leading to inefficient utilization of the storage devices. Furthermore, in Zoned Namespaces (ZNS) storage devices, zones in the storage devices may not be utilized equally, as a result, the storage usage pattern in different zones in the storage devices remain fragmented.

The information disclosed in this background of the disclosure section is only for enhancement of understanding of the general background of the invention and should not be taken as an acknowledgement or any form of suggestion that this information forms the prior art already known to a person skilled in the art.

SUMMARY

Embodiments of the disclosure addresses the problems associated with managing sequential storage devices.

According to an aspect of the disclosure, there is provided a method for managing sequential storage devices in a distributed storage environment, the method including: receiving a client allocation request from a client device; determining at least one zone set from a plurality of zone sets based on the client allocation request and input/output (I/O) parameters, each zone set of the plurality of zone sets comprising a plurality of zones of the sequential storage devices; providing the at least one zone set to the client device based on the client allocation request; and managing the sequential storage devices based on the at least one zone set, wherein each zone, among the plurality of zones is arranged into a zone set, among the plurality of zone sets, based on at least one of sequential storage device parameters, or zone parameters.

The sequential storage device parameters may include at least one of sequential storage device capacity, sequential storage device speed, or sequential storage device latency.

The zone parameters may include at least one of zone capacity or zone usage.

The plurality of zones of sequential storage devices of each zone set may be associated with different host devices or same host device.

The method may further include: tracking usage of each of the at least one zone set utilized for an I/O request; and storing information related to the tracking usage as a metadata.

The providing the at least one zone set to the client device based on the client allocation request may include: providing access to the zones of the sequential storage devices associated with the at least one zone set for performing an I/O request.

According to another aspect of the disclosure, there is provided a distributed controller for managing sequential storage devices in a distributed storage environment, the distributed controller including: a memory; a communication interface configured to communicate between one or more host devices and one or more client devices; and one or more processors configured to: receive a client allocation request from a client device; determine at least one zone set from a plurality of zone sets based on the client allocation request and input/output (I/O) parameters, each zone set of the plurality of zone sets comprising a plurality of zones of the sequential storage devices; and provide the at least one zone set to the client device based on the client allocation request to manage the sequential storage devices, wherein each zone, among the plurality of zones is arranged into a zone set, among the plurality of zone sets, based on at least one of sequential storage device parameters, or zone parameters.

The sequential storage device parameters may include at least one of sequential storage device capacity, sequential storage device speed, or sequential storage device latency.

The zone parameters may include at least one of zone capacity or zone usage.

The plurality of zones of sequential storage devices of each zone set may be associated with different host devices or same host device.

The one or more processors may be further configured to: track usage of each of the at least one zone set utilized for an I/O request; and store information related to the usage as a metadata.

The one or more processors may be further configured to: provide access to zones of the sequential storage devices associated with the at least one zone set for performing an I/O request.

According to another aspect of the disclosure, there is provided a system for managing sequential storage devices in a distributed storage environment, the system including: one or more client devices; one or more host devices; and a distributed controller configured to: receive a client allocation request from a client device; determine at least one zone set from a plurality of zone sets based on the client allocation request and input/output (I/O) parameters, each zone set of the plurality of zone sets comprising a plurality of zones of the sequential storage devices; and provide the at least one zone set to the client device based on the client allocation request to manage the sequential storage devices, wherein each zone, among the plurality of zones is arranged into a zone set, among the plurality of zone sets, based on at least one of sequential storage device parameters, or zone parameters.

The sequential storage device parameters may include at least one of sequential storage device capacity, sequential storage device speed, or sequential storage device latency; and wherein the zone parameters may include at least one of zone capacity or zone usage.

The plurality of zone of sequential storage devices of each zone set may be associated with different host devices or same host device.

The distributed controller may be configured to: track usage of each of the at least one zone set utilized for an I/O request; and store information related to the tracking usage as a metadata.

The distributed controller may be configured to: provide access to zones of the sequential storage devices associated with the at least one zone set for performing an I/O request.

According to another aspect of the disclosure, there is provided an apparatus including: one or more memories storing instructions; and one or more processors configured to execute the one or more instructions to: receive, from a client device, a request corresponding to sequential storage devices in a distributed storage environment; determine at least one zone set from a plurality of zone sets based on the request, each zone set of the plurality of zone sets comprising a plurality of zones of sequential storage devices; and provide the at least one zone set to the client device.

The one or more processors may be further configured to obtain input/output parameters corresponding to the request.

Each zone, among the plurality of zones may be arranged into a zone set, among the plurality of zone sets, based on at least one of sequential storage device parameters, or zone parameters.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF DRAWINGS

The accompanying drawings, which are incorporated in and constitute a part of this disclosure, illustrate exemplary embodiments and together with the description, serve to explain the disclosed principles. Some embodiments of device and/or methods in accordance with embodiments of the disclosure are now described below, by way of example only, and with reference to the accompanying figures.

It should be appreciated by those skilled in the art that any block diagrams herein represent conceptual views of illustrative systems embodying the principles of the disclosure. Similarly, it will be appreciated that any flowcharts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the disclosure, the word "exemplary" is used herein to mean "serving as an example, instance, or illustration." Any embodiment or implementation of the disclosure described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternatives falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

In the following detailed description of the example embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the disclosure. The following description is, therefore, not to be taken in a limiting sense.

Embodiments of the disclosure provide a method, a distributed controller and a system for managing sequential storage devices in a distributed storage environment. According to one or more example embodiments of the disclosure, the distributed controller, instead of a host (also, referred as a host device), manages a plurality of sequential storage devices by provisioning (or providing) at least one zone set to a client device based on a client allocation request. Each zone of a sequential storage device is arranged into a zone set based on at least one of sequential storage device parameters, and zone parameters (described later).

The distributed controller acts as a centralized controller for all the sequential storage devices. The use of distributed controller optimizes the performance of the sequential storage devices and the network bandwidth utilization. Further, according to one or more example embodiment, the use of the distributed controller does not interfere with Input/Output (I/O) path during data transfer between a client (also, referred as client device) and the sequential storage device as the distributed controller only facilitates the I/O path. As a consequence, the presence of the distributed controller does not add any extra overhead in the I/O path.

Figure 2A:
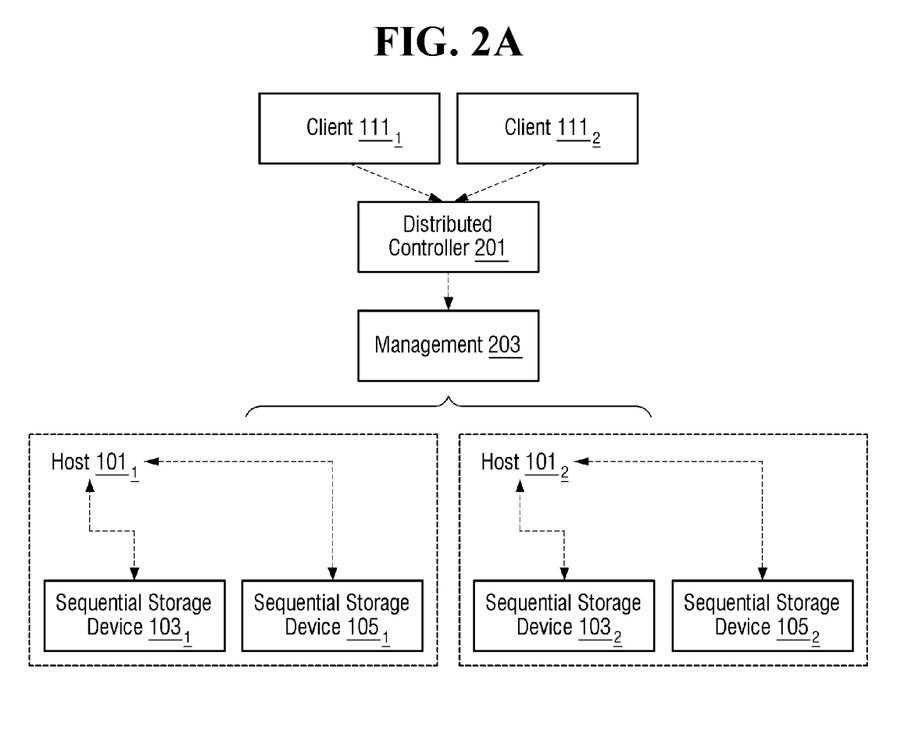
FIG. 2A illustrates a method of managing sequential storage devices in a distributed storage environment in accordance with an example embodiment of the disclosure.

FIG. 2A illustrates a method of managing sequential storage devices in a distributed storage environment in accordance with an example embodiment of the disclosure.

The system for managing sequential storage devices in a distributed storage environment includes one or more host devices $101_1$, $101_2$, one or more client devices $111_1$, $111_2$ and a distributed controller 201 as shown in FIG. 2A. For purpose of explanation, two host devices $101_1$, $101_2$ and two client devices $111_1$, $111_2$ are shown in FIG. 2A. However, the disclosure is not limited thereto, and as such, according to other example embodiments, the distributed storage environment of the disclosure can include any number of host device and client devices. The host $101_1$ manages one or more sequential storage devices $103_1$, $105_1$. The host $101_2$ manages one or more sequential storage devices $103_2$, $105_2$. For sake of explanation, each host is shown to manage two sequential storage devices. However, the disclosure is not limited thereto, and as such, according various example embodiments, there can be more than two sequential storage devices managed by each host. The sequential storage devices $103_2$, $105_2$ may be, but not limited to, flash memory, Solid State Drives (SSD) or Zoned Namespaces (ZNS) devices. The storage capacity of the sequential storage devices $103_2$, $105_2$ may be arranged into zones based on a zone capacity. A zone may be a contiguous range of Logical Block Addresses (LBAs) in the sequential storage devices $103_2$, $105_2$. Each zone may be managed as a single unit. The zone capacity refers to number of logical blocks within each zone that can be used for data storage. The zones may be conventional zones or sequential zones. The one or more client devices $111_1$, $111_2$ may be client nodes or computers accessing the plurality of sequential storage devices $103_1$, $105_1$, $103_2$, $105_2$. In one example embodiment, the distributed controller 201 may be implemented as dedicated hardware. The hardware may be configured with the functionality described in the disclosure or specific algorithm corresponding to the functionality to operate as a specialized purpose hardware. The distributed controller 201 includes one or more processors, a memory and the communication interface. The one or more processors may include at least one data processor. The distributed controller 201 is communicatively coupled to the one or more client devices $111_1$, $111_2$, the one or more host devices $101_1$, $101_2$ and the plurality of sequential storage devices $103_1$, $105_1$, $103_2$, $105_2$ through a communication interface. In one example embodiment, the communication interface between the distributed controller 201, the one or more host devices $101_1$, $101_2$ and the plurality of sequential storage devices $103_1$, $105_1$, $103_2$, $105_2$ may be provided by a control path interface. For example, the control path interface may be Remote Procedure Call (RPC) interface. The communication interface allows management of the plurality of sequential storage devices $103_1$, $105_1$, $103_2$, $105_2$ associated with at least one zone set (described later). The memory is communicatively coupled to the one or more processors of the distributed controller 201. The distributed controller 201 is configured to manage sequential storage devices in a distributed storage environment using a management 203 (also, referred as management scheme or protocol). The distributed controller 201 performs functions such as open zone (i.e., open one or more zones), close zone (i.e., close one or more zones), and reset zone (i.e., reset one or more zones) using the management 203.

In another example embodiment, the distributed controller 201 may be implemented as a software algorithm. In yet another example embodiment, the distributed controller 201 may be implemented as a combination of a software algorithm and a dedicated hardware unit.

Hereafter, the operation/method for managing sequential storage devices in a distributed storage environment in accordance with the example embodiment is explained.

Figure 2B:
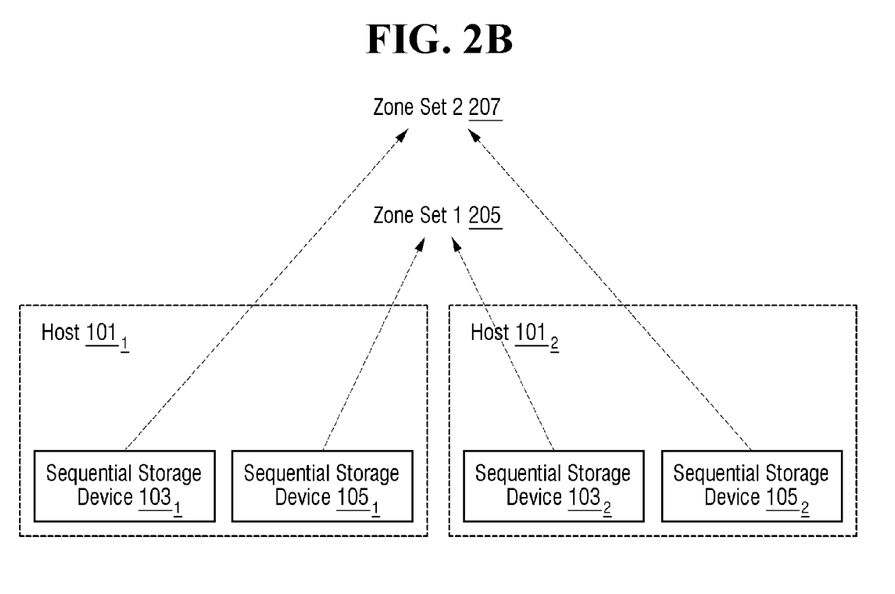
FIG. 2B illustrates arrangement of sequential storage devices into zone sets in accordance with an example embodiment of the disclosure.

At first, the distributed controller 201 receives sequential storage device parameters from the one or more host devices $101_1$, $101_2$. For example, the distributed controller 201 receives sequential storage device parameters of the sequential storage devices $103_1$, $105_1$ from the host device $101_1$. Also, the distributed controller 201 may receive sequential storage device parameters of the sequential storage devices $103_2$, $105_2$ from the host device $101_2$. The sequential storage device parameters include at least one of sequential storage device capacity, sequential storage device speed, and sequential storage device latency. Thereafter, the distributed controller 201 arranges the zones of the sequential storage device into a zone set based on at least one of sequential storage device parameters, and zone parameters. The zone parameters include at least one of zone capacity, type of zones i.e., conventional zones or sequential zones and zone usage. The zone capacity refers to how much data each zone can hold i.e., number of logical blocks within each zone that can be used for data storage. The zone usage refers to how much data is actually written to a zone. Each zone set of the plurality of zone set includes a plurality of zones of the sequential storage devices $103_2$, $105_2$. For instance, based on at least one of the sequential storage device parameters, and the zone parameters, the distributed controller 201 arranges zones of the sequential storage device $105_1$ and the sequential storage device $103_2$ into a zone set 1 (205) and zones of the sequential storage device $103_1$ and the sequential storage device $105_2$ into a zone set 2 (207) as shown in FIG. 2B. The plurality of zones of the sequential storage devices of each zone set are associated with different host devices or same host device. With reference to FIG. 2 FIG. 2B, the zones of the sequential storage device $103_1$ and the sequential storage device $105_2$ of the zone set 2 (207) are associated with different host devices i.e., the host $101_1$ and the host $101_2$, respectively. Also, the zones of the sequential storage device $105_1$ and the sequential storage device $103_2$ of the zone set 1 (205) may be associated with different host devices i.e., the host $101_1$ and the host $101_2$, respectively.

For the sake of explanation, consider a scenario in which the zones of the sequential storage device $105_1$ and the sequential storage device $103_2$ of the zone set 1 (205) can store data up to 500 Mb (i.e., zone capacity of 500 Mb) and the zones of the sequential storage device $103_1$ and the sequential storage device $105_2$ of the zone set 2 (207) can store data up to 2 Gb (i.e., zone capacity of 2 Gb). Prior to performing an I/O operation (i.e., a data write request, or a data read request), the distributed controller 201 receives a client allocation request from a client device, for example, from the client device $111_2$. The distributed controller 201 determines at least one zone set from a plurality of zone set (205), (207) based on the client allocation request and I/O parameters. According to an example embodiment, the I/O parameters may be predefined I/O parameters. The predefined I/O parameters may include at least one of block address (i.e., location of blocks of data), and length (i.e., length of data). For instance, if predefined I/O parameters includes length as 700 Mb, the distributed controller 201 determines the zone set 2 (207), which can handle/store data up to 2 Gb, from the plurality of zone set (205), (207). The distributed controller 201 provisions (or providing) zone sets for the client device to use for its I/O operation and does not take part in the I/O operation. Thereafter, the distributed controller 201 provisions (or provides) the plurality of zones of the sequential storage devices associated with the at least one zone set based on the client allocation request. In this case, the distributed controller 201 provisions (or provides) the plurality of zones of the sequential storage devices $103_1$, $105_2$ associated with the at least one zone set (207) based on the client allocation request. In detail, the distributed controller 201 provides the client device $111_2$ access to the zones of the sequential storage devices $103_1$, $105_2$ associated with the at least one zone set (207) for performing the I/O operation. Thereafter, the client device $111_2$ writes data into the plurality of zones of the sequential storage devices $103_1$, $105_2$ associated with the at least one zone set (207). The use of the distributed controller 201 does not come in I/O path during data transfer between the client device and (zones of) the sequential storage devices as the distributed controller only facilitates the I/O path. As a consequence, the presence of the distributed controller does not add any extra overhead in the I/O path. For each I/O operation, the distributed controller 201 tracks usage of each of the at least one zone set utilized for the I/O operation. The distributed controller 201 stores information related to the tracking usage as a metadata in the memory of the distributed controller 201.

Figure 3:
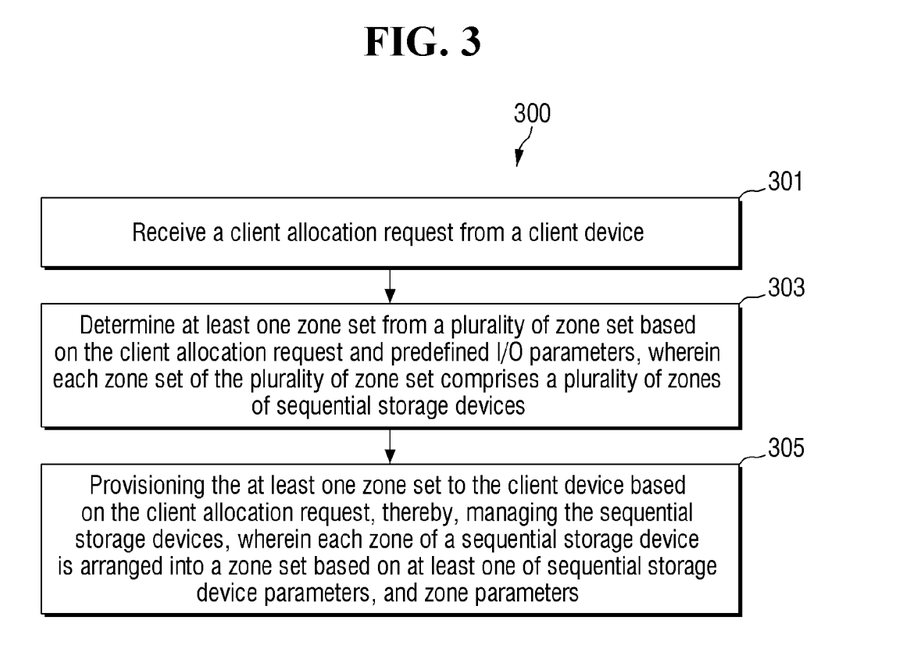
FIG. 3 illustrates a flowchart showing a method for managing sequential storage devices in a distributed storage environment in accordance with an example embodiment of the disclosure.

FIG. 3 illustrates a flowchart showing a method for managing sequential storage devices in a distributed storage environment in accordance with an example embodiment of the disclosure.

As illustrated in FIG. 3, the method 300 includes one or more blocks for managing sequential storage devices in the distributed storage environment in accordance with the example embodiment. The method 300 may be described in the general context of computer executable instructions. Generally, computer executable instructions can include routines, programs, objects, components, data structures, procedures, modules, and functions, which perform particular functions or implement particular abstract data types.

The order in which the method 300 is described is not intended to be construed as a limitation, and any number of the described method blocks can be combined in any order to implement the method. Additionally, individual blocks may be deleted from the methods without departing from the scope of the disclosure described herein. Furthermore, the method can be implemented in any suitable hardware, software, firmware, or combination thereof.

At block 301, the distributed controller 201 may receive a client allocation request from a client device. For example, the client device may be client device $111_2$.

At block 303, the distributed controller 201 may determine at least one zone set (205) from a plurality of zone set (205), (207) based on the client allocation request and predefined I/O parameters. Each zone set of the plurality of zone set (205), (207) may include a plurality of zones of sequential storage devices. The plurality of zones of the sequential storage devices of each zone set may be associated with different host devices or same host device.

At block 305, the distributed controller 201 may provision the plurality of zone of the sequential storage devices $105_1$, $103_2$ associated with the at least one zone set (205) based on the client allocation request. In detail, the distributed controller 201 may provide access to the plurality of zone of the sequential storage devices $105_1$, $103_2$ associated with the at least one zone set (205) for performing an I/O operation. Each zone of a sequential storage device may be arranged into a zone set based on at least one of sequential storage device parameters, and zone parameters. The sequential storage device parameters may include at least one of sequential storage device capacity, sequential storage device speed, and sequential storage device latency. The zone parameters may include at least one of zone capacity and zone usage.

According to an aspect of the disclosure, the use of the distributed controller optimizes the utilization of the sequential storage devices by creating zone sets of the sequential storage devices based on the sequential storage device parameters and utilizing the zone sets based on I/O request and predefined I/O parameters.

According to another aspect of the disclosure, the use of the distributed controller optimizes the network bandwidth utilization by provisioning storage areas in zone sets, on client allocation requests, by considering the network utilization across storage devices (or nodes), and Network Interface Card (NIC) capabilities.

According to another aspect of the disclosure, the use of the distributed controller does not come in I/O path during data transfer between a client device and sequential storage devices as the distributed controller only facilitates the I/O path. As a consequence, the presence of the distributed controller does not add any extra overhead in the I/O path.

The terms "an example embodiment", "example embodiment", "example embodiments", "the example embodiment", "the example embodiments", "one or more example embodiments", "some example embodiments", and "one example embodiment" mean "one or more (but not all) example embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an example embodiment with several components in communication with each other does not imply that all such components are required. On the contrary, a variety of optional components are described to illustrate the wide variety of possible example embodiments of the disclosure.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other example embodiments of the invention need not include the device itself.

The illustrated operations of FIG. 3 show certain events occurring in a certain order. In alternative example embodiments, certain operations may be performed in a different order, modified or removed. Moreover, steps may be added to the above-described logic and still conform to the described example embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the disclosure. It is therefore intended that the scope of the invention be limited not by this detailed description, but rather by any claims that issue on an application based here on. Accordingly, the disclosure of the example embodiments of the invention is intended to be illustrative, but not limiting, of the scope of the invention, which is set forth in the following claims.

While various aspects and example embodiments have been disclosed herein, other aspects and example embodiments will be apparent to those skilled in the art. The various aspects and example embodiments disclosed herein are for purposes of illustration and are not intended to be limiting, with the true scope being indicated by the following claims.

What is claimed is:

1. A method for managing sequential storage devices in a distributed storage environment, the method comprising:
receiving a client allocation request from a client device;
determining at least one zone set from a plurality of zone sets based on the client allocation request and input/output (I/O) parameters, each zone set of the plurality of zone sets comprising a plurality of zones of the sequential storage devices;
providing the at least one zone set to the client device based on the client allocation request; and
managing the sequential storage devices based on the at least one zone set,
wherein each zone, among the plurality of zones is arranged into a zone set, among the plurality of zone sets, based on sequential storage device parameters and zone parameters, and
wherein a first zone and a second zone, among the plurality of zones in a first zone set are associated with different host devices, and
wherein the managing of the sequential storage devices based on the at least one zone set comprises performing, using a central controller, one or more zone operations in a centralized manner across the different host devices.

2. The method as claimed in claim 1, wherein the sequential storage device parameters comprise at least one of sequential storage device capacity, sequential storage device speed, or sequential storage device latency.

3. The method as claimed in claim 1, wherein the zone parameters comprise at least one of zone capacity or zone usage.

4. The method as claimed in claim 1, further comprises:
tracking usage of each of the at least one zone set utilized for an I/O request; and
storing information related to the tracked usage as a metadata.

5. The method as claimed in claim 1, wherein the providing the at least one zone set to the client device based on the client allocation request comprises:
providing access to the zones of the sequential storage devices associated with the at least one zone set for performing an I/O request.

6. The method as claimed in claim 1, wherein the first zone is a zone of a first sequential storage device of a first host arranged in the first zone set and the second zone is a zone of a second sequential storage device of a second host arranged in the first zone set.

7. A central controller for managing sequential storage devices in a distributed storage environment, the central controller comprising:
a memory;
a communication interface configured to communicate between one or more host devices and one or more client devices; and
one or more processors configured to:
receive a client allocation request from a client device;
determine at least one zone set from a plurality of zone sets based on the client allocation request and input/output (I/O) parameters, each zone set of the plurality of zone sets comprising a plurality of zones of the sequential storage devices; and
provide the at least one zone set to the client device based on the client allocation request to manage the sequential storage devices,
wherein each zone, among the plurality of zones is arranged into a zone set, among the plurality of zone sets, based on sequential storage device parameters and zone parameters, and
wherein a first zone and a second zone, among the plurality of zones in a first zone set are associated with different host devices, and
wherein the managing the sequential storage devices based on the at least one zone set comprises performing, using the central controller, one or more zone operations in a centralized manner across the different host devices.

8. The central controller as claimed in claim 7, wherein the sequential storage device parameters comprise at least one of sequential storage device capacity, sequential storage device speed, or sequential storage device latency.

9. The central distributed controller as claimed in claim 7, wherein the zone parameters comprise at least one of zone capacity or zone usage.

10. The central controller as claimed in claim 7, wherein the one or more processors are further configured to:
track usage of each of the at least one zone set utilized for an I/O request; and
store information related to the usage as a metadata.

11. The central controller as claimed in claim 7, wherein the one or more processors are further configured to:
provide access to zones of the sequential storage devices associated with the at least one zone set for performing an I/O request.

12. A system for managing sequential storage devices in a distributed storage environment, the system comprising:
one or more client devices;
one or more host devices; and
a central controller configured to:
receive a client allocation request from a client device;
determine at least one zone set from a plurality of zone sets based on the client allocation request and input/output (I/O) parameters, each zone set of the plurality of zone sets comprising a plurality of zones of the sequential storage devices; and provide the at least one zone set to the client device based on the client allocation request to manage the sequential storage devices, wherein each zone, among the plurality of zones is arranged into a zone set, among the plurality of zone sets, based on sequential storage device parameters and zone parameters, wherein a first zone and a second zone, among the plurality of zones in a first zone set are associated with different host devices, and wherein the managing of the sequential storage devices based on the at least one zone set comprises performing, using the central controller, one or more zone operations in a centralized manner across the different host devices.

13. The system as claimed in claim 12, wherein the sequential storage device parameters comprise at least one of sequential storage device capacity, sequential storage device speed, or sequential storage device latency; and wherein the zone parameters comprise at least one of zone capacity or zone usage.

14. The system as claimed in claim 12, wherein the central controller is configured to:

track usage of each of the at least one zone set utilized for an I/O request; and store information related to the tracked usage as a metadata.

15. The system as claimed in claim 12, wherein the central controller is configured to:

provide access to zones of the sequential storage devices associated with the at least one zone set for performing an I/O request.

16. An apparatus comprising:

one or more memories storing instructions; and one or more processors configured to execute the one or more instructions to:

receive, from a client device, a request corresponding to a sequential storage device in a distributed storage environment;

determine at least one zone set from a plurality of zone sets based on the request, each zone set of the plurality of zone sets comprising a plurality of zones of sequential storage devices arranged based on sequential storage device parameters and zone parameters;

provide the at least one zone set to the client device, wherein a first zone and a second zone, among the plurality of zones in a first zone set are associated with different host devices, and wherein the one or more processors is further configured to execute the one or more instructions to:

manage the sequential storage devices based on the at least one zone set by performing, using the central controller, one or more zone operations in a centralized manner across the different host devices.

17. The apparatus of claim 16, wherein the one or more processors is further configured to obtain input/output parameters corresponding to the request.

18. The apparatus of claim 16, wherein each zone, among the plurality of zones is arranged into a zone set, among the plurality of zone sets, based on at least one of sequential storage device parameters, or zone parameters.

* * * * *